United States Patent
Cai et al.

(10) Patent No.: US 9,942,131 B2
(45) Date of Patent: Apr. 10, 2018

(54) MULTIPATHING USING FLOW TUNNELING THROUGH BOUND OVERLAY VIRTUAL MACHINES

(71) Applicant: International Business Machines Corporation, Armonk, NY (US)

(72) Inventors: Xiao Cai, Champaign, IL (US); Hani T. Jamjoom, Cos Cob, CT (US); Thai Franck Le, White Plains, NY (US); Daniel J. Williams, Ithaca, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/813,025

(22) Filed: Jul. 29, 2015

(65) Prior Publication Data

US 2017/0034046 A1 Feb. 2, 2017

(51) Int. Cl.
- *H04L 12/707* (2013.01)
- *G06F 9/455* (2006.01)
- *H04L 29/12* (2006.01)
- *H04L 12/715* (2013.01)

(52) U.S. Cl.
CPC .......... *H04L 45/24* (2013.01); *G06F 9/45558* (2013.01); *H04L 45/64* (2013.01); *H04L 61/2514* (2013.01); *H04L 61/2592* (2013.01); *G06F 2009/45595* (2013.01)

(58) Field of Classification Search
None
See application file for complete search history.

(56) References Cited

U.S. PATENT DOCUMENTS

| 9,203,784 | B2 * | 12/2015 | Chang | H04L 49/70 |
| 9,444,887 | B2 * | 9/2016 | Huang | H04L 45/64 |
| 2005/0083848 | A1 * | 4/2005 | Shao | H04L 45/00 370/238 |
| 2007/0230352 | A1 * | 10/2007 | Kokku | H04L 45/00 370/238 |

(Continued)

FOREIGN PATENT DOCUMENTS

EP 2624509 A2 4/2013

OTHER PUBLICATIONS

Artigas et al, A Novel Methodology for Constructing Secure Multipath Overlays, 2005, IEEE computer society, pp. 50-57.*

(Continued)

*Primary Examiner* — Abu Zar Ghaffari
(74) *Attorney, Agent, or Firm* — Garg Law Firm, PLLC; Rakesh Garg; Jennifer R. Davis (57) ABSTRACT

For multipathing using a network of overlays, a set of virtual network interfaces (VNICs) corresponding to a physical network interface (PNIC) is created in a first data processing system. A first virtual network interface (VNIC) from the set of VNICs is bound to a virtual machine (VM) executing in a first data processing environment across a data network from the first data processing system. During a data communication with a second data processing system, data is divided into a first portion and a second portion, the first portion using a first path from the first VNIC to the first VM to the second data processing system, and the second portion using a second path from the PNIC to the second data processing system.

16 Claims, 7 Drawing Sheets

(56) References Cited

U.S. PATENT DOCUMENTS

| | | | | |
|---|---|---|---|---|
| 2009/0150527 | A1* | 6/2009 | Tripathi | H04L 45/586 709/221 |
| 2010/0211946 | A1* | 8/2010 | Elzur | G06F 9/45537 718/1 |
| 2012/0002535 | A1* | 1/2012 | Droux | H04L 45/245 370/216 |
| 2012/0093150 | A1 | 4/2012 | Kini | |
| 2012/0099601 | A1 | 4/2012 | Haddad | |
| 2012/0227041 | A1* | 9/2012 | Lambeth | H04L 29/12839 718/1 |
| 2012/0331160 | A1 | 12/2012 | Tremblay et al. | |
| 2013/0077501 | A1 | 3/2013 | Krishnaswamy et al. | |
| 2013/0136116 | A1* | 5/2013 | Viswanathan | H04W 76/02 370/338 |
| 2013/0304892 | A1* | 11/2013 | Afergan | H04L 69/16 709/223 |
| 2013/0322460 | A1* | 12/2013 | DeCusatis | H04L 45/24 370/419 |
| 2014/0092809 | A1* | 4/2014 | Guo | H04W 40/12 370/328 |
| 2015/0055499 | A1* | 2/2015 | Zheng | H04L 47/56 370/252 |
| 2015/0121372 | A1* | 4/2015 | Hatta | G06F 9/54 718/1 |
| 2015/0127701 | A1* | 5/2015 | Chu | H04L 45/22 709/201 |
| 2015/0304208 | A1* | 10/2015 | van Bemmel | H04L 45/14 709/238 |
| 2015/0370586 | A1* | 12/2015 | Cooper | G06F 9/45533 710/308 |
| 2016/0050145 | A1* | 2/2016 | Tsirkin | H04L 45/745 718/105 |
| 2016/0057014 | A1* | 2/2016 | Thakkar | G06F 9/45558 709/223 |
| 2016/0182342 | A1* | 6/2016 | Singaravelu | H04L 43/16 370/253 |
| 2016/0269318 | A1* | 9/2016 | Su | H04L 47/805 |

OTHER PUBLICATIONS

Hesmans et al, Tracing Multipath TCP Connections, 2014, ACM, SIGCOMM'14, pp. 361-362.*

Jones et al, An Overlay Architecture for Throughput Optimal Multipath Routing, 2014, ACM, MobiHoc'14, pp. 73-82.*

Kaur et al, BANANAS: An Evolutionary Framework for Explicit and Multipath Routing in the Internet, ACM, 2003, SIGCOMM 2003, pp. 1-12.*

Svetlana et al, A Benchmarking System for Multipath Overlay Multimedia Streaming, 2008, IEEE, IEEE International Conference on Multimedia and Expo, pp. 1-4.*

Wang et al, Multipath Overlay Data Transfer, 2005, University of Massachusetts, Amherst, pp. 1-13.*

Zhang et al, To improve throughput via multi-pathing and Parallel TCP on each path, 2009, IEEE, Fourth ChinaGrid Annual Conference, pp. 16-21.*

Costin Raiciu, Sebastien Barre, Christopher Pluntke, Adam Greenhalgh, Damon Wischik, and Mark Handley. 2011. "Improving datacenter performance and robustness with multipath TCP." In Proceedings of the ACM SIGCOMM 2011. ACM, New York, NY, USA.

Han, H., et al. "Overlay TCP for multi-path routing and congestion control." IMA Workshop on Measurements and Modeling of the Internet. 2004.

* cited by examiner

MULTIPATHING USING FLOW TUNNELING THROUGH BOUND OVERLAY VIRTUAL MACHINES

TECHNICAL FIELD

The present invention relates generally to a method, system, and computer program product for improving the performance of data communication networks. More particularly, the present invention relates to a method, system, and computer program product for multipathing using a network of overlays.

BACKGROUND

A data network facilitates data transfers between two or more data processing systems. For example, an application executing in one data processing system acts as the sender of the data, and another application executing in another data processing system acts as the receiver of the data. Between the sender system and the receiver system, the data follows a data path that comprises a series of links between networking components, such as routers and switches. A link is also known as a hop.

For example, a data network exists between a network interface in the sender system and a network interface in the receiver system. A Transmission Control Protocol (TCP) session between a sender system and a receiver system sets up a data communication path—a default path—using such a series of links through the data network.

TCP is a commonly used communication protocol used for communicating packet data from one data processing system to another over a data network. Establishing a TCP session between two data processing systems involves a multi-step exchange of preliminary information between the two systems. This multi-step exchange of information is called a three-way handshake, or simply, a handshake.

A multipath network is a data network in which more than one outgoing communication paths are available for sending data from a system, more than one incoming communications paths are available for receiving data at the system, or both. A data communication session, e.g., a TCP session with the system can use any one of the outgoing paths and any one of the incoming paths.

MultiPath TCP (MPTCP) is a modification of TCP where multiple network interfaces can be concurrently used in a TCP session. For example, modern smartphones and other portable devices are able to communicate data over a variety of data networks, such as over cellular broadband and over Wi-Fi. Each network over which a device communicates uses a different network interface in the device. The communications over a cellular broadband network use a network interface in the device, which is designed and configured to communicate over a cellular broadband network, and similarly, the communications over Wi-Fi use a network interface in the device, which is designed and configured to communicate over a wireless TCP/IP network.

As an example, MPTCP allows the device to use the cellular broadband network interface as well as the Wi-Fi network interface concurrently in a TCP session. A portion of a TCP session data flow, which uses one of several network interfaces is called a sub-flow. Presently, an MPTCP component in the device measures the throughputs of each sub-flow and distributes the data traffic over the different sub-flows to achieve an optimal throughput.

SUMMARY

The illustrative embodiments provide a method, system, and computer program product for multipathing using a network of overlays. An embodiment includes a method for multipathing using a network of overlays. The embodiment creates, using a processor and a memory, a set of virtual network interfaces (VNICs) corresponding to a physical network interface (PNIC) in a first data processing system. The embodiment binds a first virtual network interface (VNIC) from the set of VNICs to a virtual machine (VM) executing in a first data processing environment across a data network from the first data processing system. The embodiment divides, during a data communication with a second data processing system, data into a first portion and a second portion, the first portion using a first path from the first VNIC to the first VM to the second data processing system, and the second portion using a second path from the PNIC to the second data processing system.

Another embodiment includes a computer usable program product comprising a computer readable storage device including computer usable code for multipathing using a network of overlays.

Another embodiment includes a data processing system for multipathing using a network of overlays.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

When a TCP session is established between two endpoints, such as between a client system and a server system, a path is selected according to the underlying routing system between the two endpoints. The illustrative embodiments recognize that selected data path may not be the best path for the TCP session. For example, the selected path may provide a throughput of only thirty megabits per second (MBPS) whereas an alternate path through a specific node in the data network may provide a greater throughput, e.g., a throughput of sixty MBPS.

Presently, the internet routing system does not take into account any performance metrics of competing paths between two endpoints. Therefore, the data traffic of a TCP session has to use the data path selected according to the internet routing system and cannot be forced to pass through a particular node in the network to improve the path performance. Thus, even if a better performing path were available through the network, the path selected by the internet routing system has to be used for the TCP session.

The illustrative embodiments used to describe the invention generally address and solve the above-described problems and other problems related to the performance of internet routing system selected paths. The illustrative embodiments provide a method, system, and computer program product for multipathing using a network of overlays.

The illustrative embodiments use a server and a client as non-limiting examples of the endpoints that participate in a typical TCP session. Within the scope of the illustrative embodiments, an embodiment described with respect to a server can be implemented in a server data processing system, a client data processing system, or both, depending upon the implementation.

Only as a non-limiting example, consider that an embodiment is executing in a server endpoint (first endpoint). The endpoint uses a physical network interface card (PNIC) for a TCP session with another endpoint, e.g., a client endpoint (second endpoint).

The embodiment virtualizes the PNIC and creates one or more virtual network interface (VNIC) structure. A VNIC is a logical structure, which is created through execution of code, which behaves as a network interface, and to which a network address such as an IP address can be assigned. The embodiment assigns different network addresses to the PNIC and the various VNICs.

Many datacenters operate around the world. Data processing systems operating within these datacenters facilitate the flow of internet data traffic. An embodiment creates an overlay virtual machine (VM) in a data processing system in such a datacenter. The datacenter and the overlay VM therein are reachable from the first endpoint. The embodiment creates any number of such overlay VMs in the datacenter, and similarly in any number different datacenters across the internet. Each overlay VM has a network interface using which the overlay VM can perform data communications.

An embodiment binds an address of a VNIC of the first endpoint to an overlay VM in a datacenter. The binding operation creates a tunnel through the data network between the first endpoint and the overlay VM such that any data traffic that the first endpoint places on the VNIC has to flow to the overlay VM. Similarly, any data traffic that the overlay VM sends through tunnel has to flow to the first endpoint. The embodiment similarly binds any number of VNIC addresses to any corresponding number of overlay VMs operating in any datacenter anywhere on the internet.

Configured and bound in this manner, an embodiment thus creates one or more designated pathways along which the data traffic flows between the first endpoint and the one or more datacenters. An embodiment can create VNICs in the first endpoint on demand, such as by adding VNICs when the demand on the first endpoint exceeds a threshold, and removing a VNIC when the demand reduces below another threshold. With the addition or removal of VNICs at the first endpoint, an embodiment creates or terminates, respectively, overlay VMs in one or more datacenters, and creates or ends tunnels as described herein.

Different tunnels between the first endpoint and the overlay VMs are likely to have different throughputs and performance metrics depending on a variety of factors. Some example factors that affect a performance metric of a tunnel include, but are not limited to, time of the day, day of the week, location of the datacenter, load on the datacenter, load on the data processing system in the datacenter where an overlay VM is executing, a congestion of latency at a networking component operating in the tunnel, and the like.

An embodiment configures a Network Address Translation (NAT) such that an outbound data traffic from the first endpoint via a tunnel to an overlay VM appears to a second endpoint as if the data traffic originated from the overlay VM with the overlay VM's network address as the source address. The NAT also operates in the other direction such that an inbound data traffic from the second endpoint to the overlay VM at the overlay VM's network address reaches the first endpoint at the VNIC associated with the tunnel. Each VNIC address associated with each operating tunnel at any given time is similarly NAT-ed to the network address of the overlay VM that corresponds to the operating tunnel.

Suppose that the second endpoint establishes a TCP session with the first endpoint. The second endpoint sends a TCP handshake data packet to the first endpoint. An embodiment in the first endpoint transmits to the second endpoint a set of NAT addresses the first endpoint is using at the time of the TCP session. In other words, the first endpoint informs the second endpoint about one or more network addresses of one or more overlay VMs with which the first endpoint has operational tunnels at the time.

Thereafter, the TCP handshake completes and the session is established between the first endpoint and the second endpoint. The TCP session is setup using a default path selected by the internet routing system between the PNIC of the first endpoint and a network interface at the second endpoint.

When the first endpoint has to send data to the second endpoint, instead of relying on a data path created according to the internet routing system, the first endpoint divides or spreads the data over a set of paths. The set of paths includes the one or more tunnels with the one or more overlay VMs whose addresses were to the second endpoint sent during the handshake, the default path, or some combination thereof.

Suppose, for example, the TCP session is configured to use path 1, path 2, path 3, and the default path. Path 1 includes the tunnel between the first endpoint and overly VM 1. Path 2 includes the tunnel between the first endpoint and overly VM 2. Path 3 includes the tunnel between the first endpoint and overly VM 3. The default path is the path setup by the internet routing system. An embodiment distributes portion 1 of the outbound data from the first endpoint to path 1, such that portion 1 reaches the second endpoint via overlay VM 1. Similarly, the embodiment distributes portion 2 of the outbound data from the first endpoint to path 2, such that portion 2 reaches the second endpoint via overlay VM 2. An embodiment may not use all the paths in the set of paths for a data communication. For example, given the size of the outbound data, the embodiment may use only path 1, paths 1 and 2, use paths 1, 2, and 3, or paths 1, 2, and 3, and the default path. Generally, the embodiment can use any combination of the paths in the set of paths.

The overlay VMs of the respective paths send their respective outbound data portions to the second endpoint. When the second endpoint is MPTCP-enabled, the second endpoint can establish concurrent paths with each such overlay VM to receive the corresponding portions of the data.

When the second endpoint has data to send to the first endpoint, the second endpoint can send that data to any of the overlay VMs that are known to be associated and operating with the first endpoint. Whichever overlay VM receives the data from the second endpoint forwards the data to the first endpoint because of the NAT.

When the second endpoint is MPTCP-enabled, the operation described herein allows for the first and the second endpoints to be able to utilize preferred paths via one or more of the tunnels at the overlay VMs at one or more datacenters of choice. The throughput of a single preferred path is better as compared to a default path in a majority of cases. When multiple preferred paths, with or within including the default path, are used, the throughput of the set of paths according to an embodiment is significantly better than the performance of a default path setup by the internet routing system.

A method of an embodiment described herein, when implemented to execute on a device or data processing system, comprises substantial advancement of the functionality of that device or data processing system in multipathing using a network of overlays. For example, prior-art internet routing system configures a route between two endpoints in a TCP session without considering the performance metrics of the route and other possible alternate routes through a data network. An embodiment virtualizes a PNIC, and creates bound tunnels between each VNIC and a corresponding overlay VM operating in selected datacenter. An embodiment locates the overlay VM at datacenters selected by considering their latency, congestion, data processing system performance, and other such factors. Thus, a path between the endpoints that uses a tunnel through such an overlay VM significantly improves the performance of the data connection between the two endpoints. Such manner of operating a data network is unavailable in presently available devices or data processing systems. Thus, a substantial advancement of such devices or data processing systems by executing a method of an embodiment allows data traffic to be routed through preferred tunnels in existing network infrastructure, and significantly improves the performance of the data paths.

The illustrative embodiments are described with respect to certain endpoints, network interfaces, overlays, VMs, datacenters, paths, tunnels, routes, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
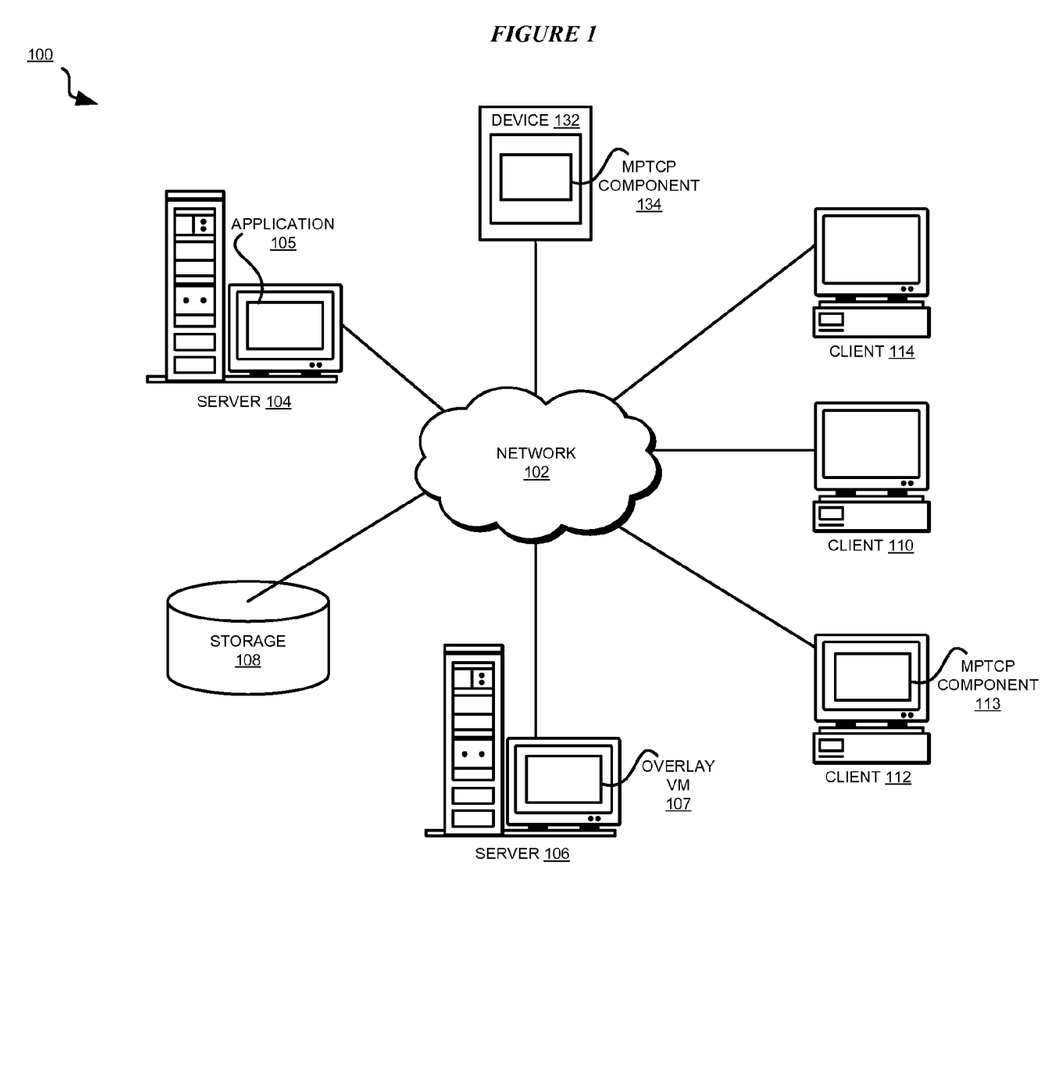
FIG. 1 depicts a block diagram of a network of data processing systems in which illustrative embodiments may be implemented.
Figure 2:
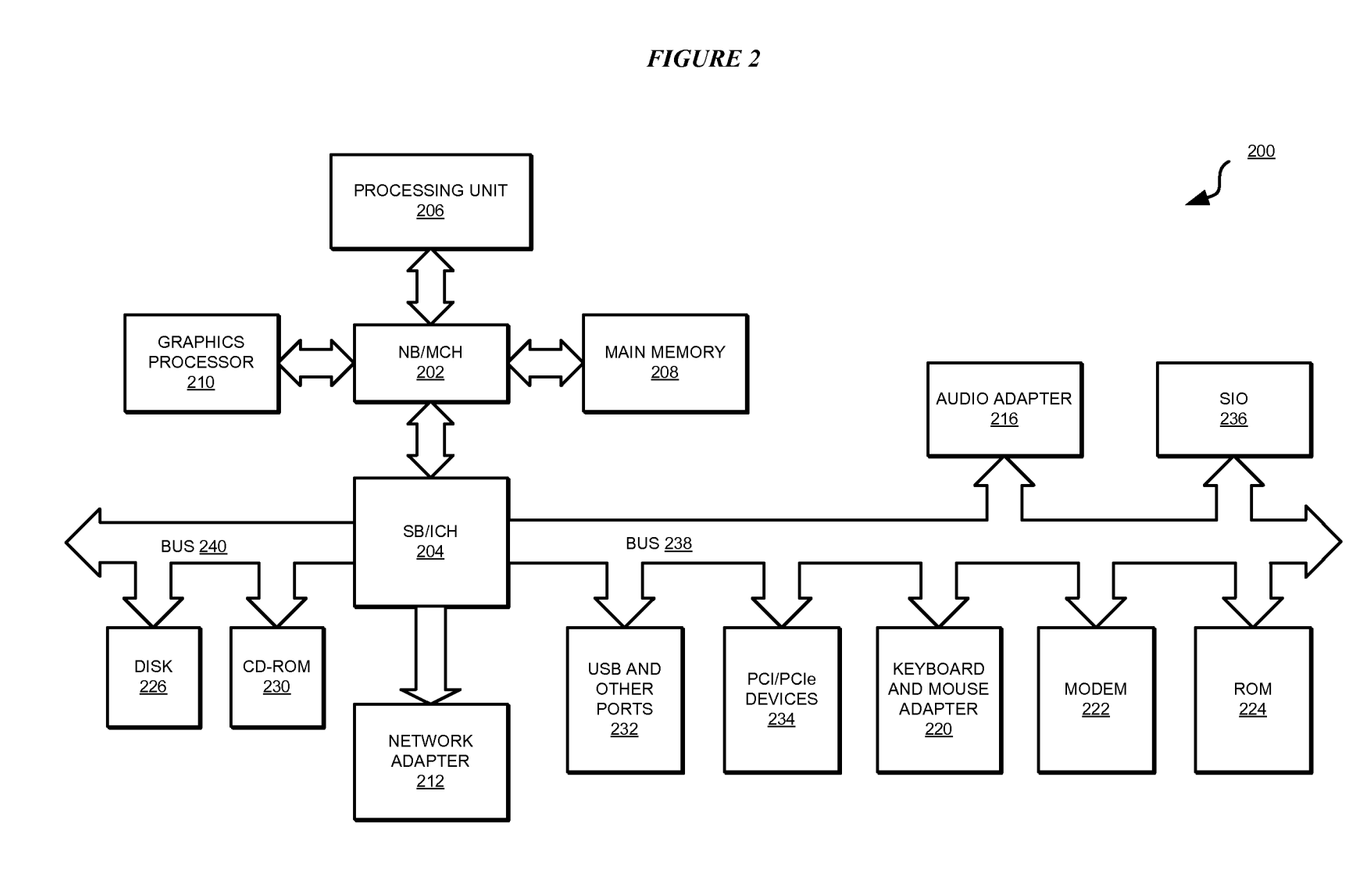
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired communication links, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server 104, client 112, and device 132 are each a non-limiting example of an endpoint as described herein. As an example, suppose that client 112 or device 132 establishes a TCP session with server 104. Application 105 in server 104 implements an embodiment described herein. Server 106 is an example of a data processing system in a datacenter. Server 106 is accessible to application 105 over network 102. Overlay VM 107 in server 106 is an example of an overlay VM described herein. MPTCP capabilities are assumed at client 112 and device 132 only as a non-limiting example and are not necessary for the operation of an embodiment described herein. MPTCP component 113 provides MPTCP capabilities at client 112. MPTCP component 134 provides MPTCP capabilities at device 132.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 and overlay VM 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
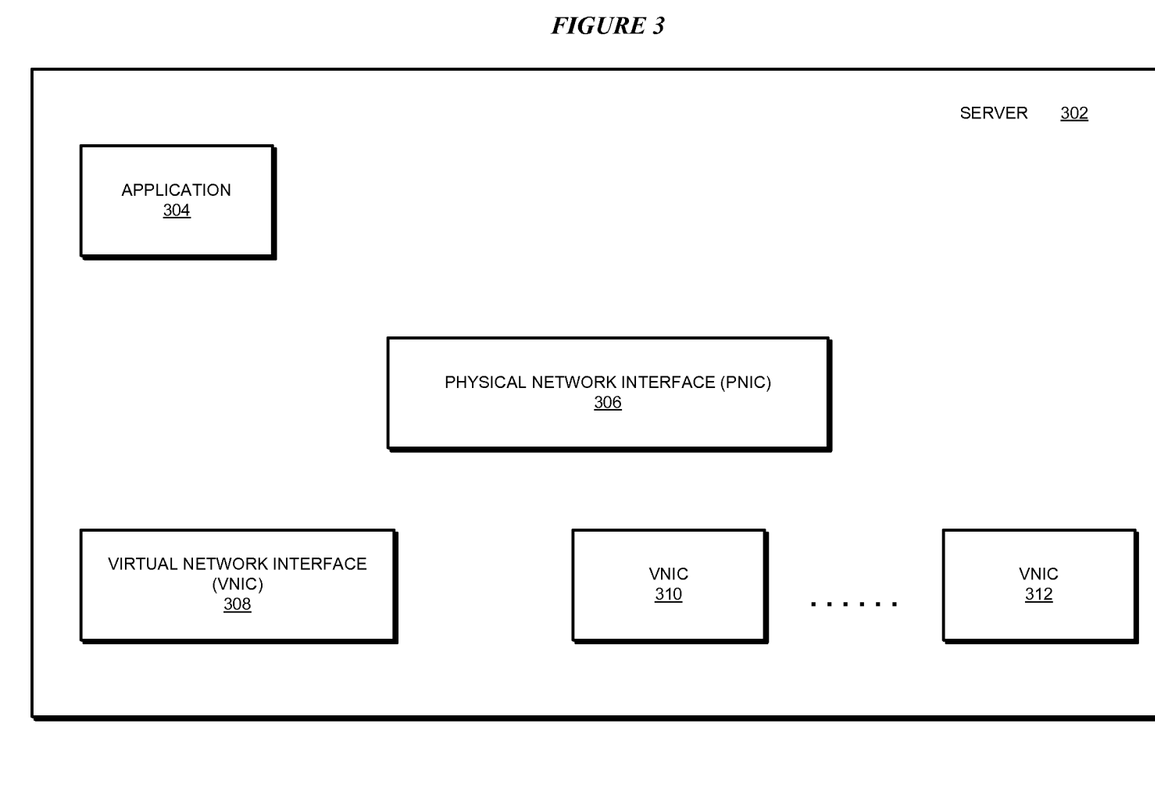
FIG. 3 depicts a block diagram of example configuration for multipathing using a network of overlays in accordance with an illustrative embodiment.

With reference to FIG. 3, this figure depicts a block diagram of example configuration for multipathing using a network of overlays in accordance with an illustrative embodiment. Server 302 is an example of server 104 in FIG. 1. Application 304 is an example of application 105 in FIG. 1.

Application 304 virtualizes PNIC 306 into a set of VNICs, such as VNIC 308, VNIC 310, and VNIC 312. Each of PNIC 306 and VNICs 308, 310, and 312 is sable to bind to an overlay VM (not shown) in a manner described herein.

Figure 4:
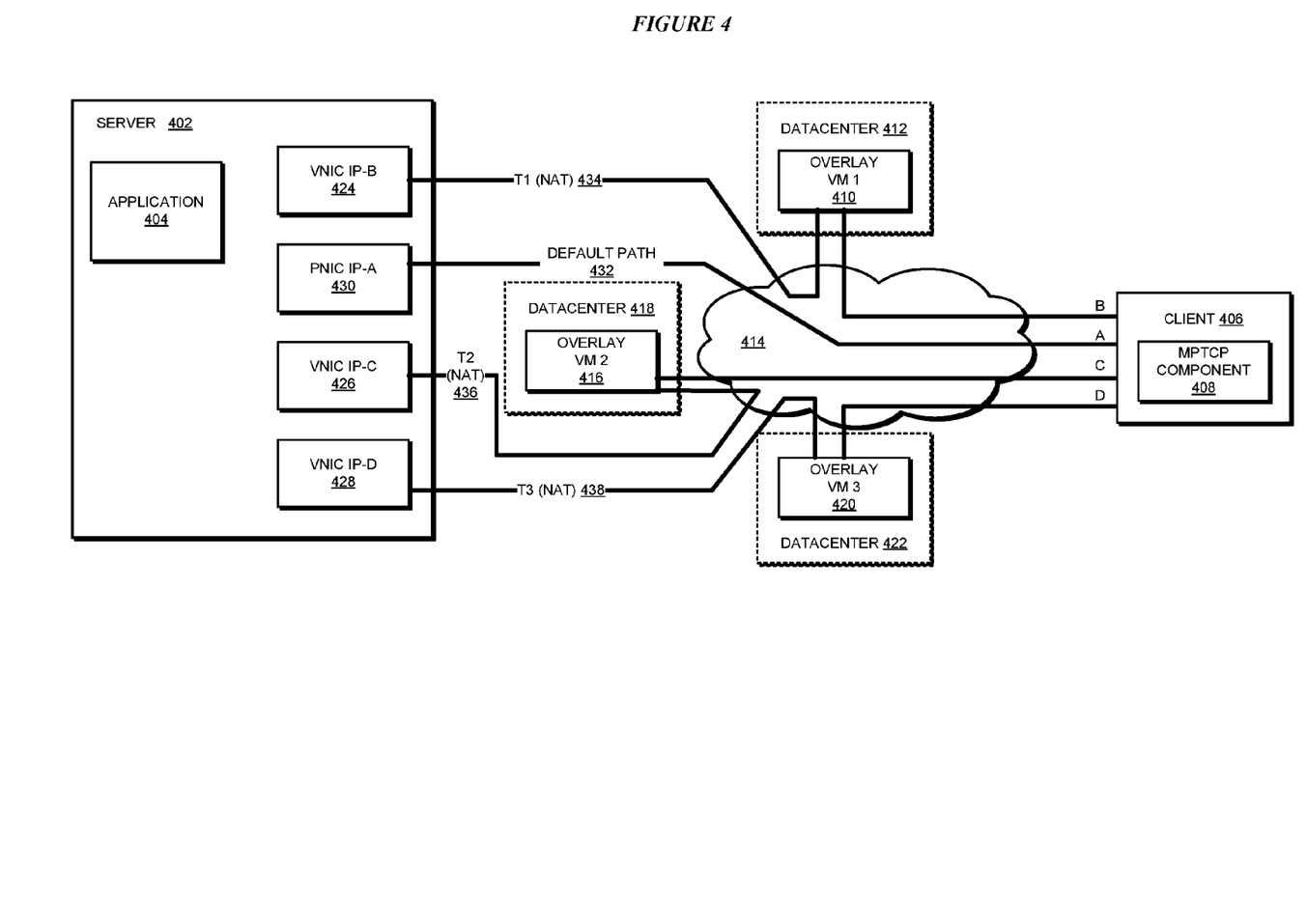
FIG. 4 depicts a block diagram of an example configuration for multipathing using a network of overlays in accordance with an illustrative embodiment.

With reference to FIG. 4, this figure depicts a block diagram of an example configuration for multipathing using a network of overlays in accordance with an illustrative embodiment. Server 402 is an example of server 302 in FIG. 3. Application 404 is an example of application 304 in FIG. 3.

Client 406 is an example of client 112 or device 132 in FIG. 1. Accordingly, MPTCP component 408 is an example of component 113 or 134 in FIG. 1.

Overlay VM 410 is an example of overlay VM 107 in FIG. 1, and executes in a data processing system in datacenter 412. Overlay VM 410 is reachable from server 402 over network 414. Similarly, overlay VM 416 executes in datacenter 418 and overlay VM 420 executes in datacenter 422.

VNICs 424, 426, and 428 are examples of VNICs 308, 310, and 312 in FIG. 3. PNIC 430 is an example of PNIC 306 in FIG. 3.

Application 404 assigns a network address to each PNIC and VNIC in server 402 used for multipathing using a network of overlays according to an embodiment. For example, assume that PNIC 430 uses an IP address, which is referred to herein as IP-A. VNIC 424 uses an IP address, which is referred to herein as IP-B, VNIC 426 uses an IP address, which is referred to herein as IP-C, and VNIC 428 uses an IP address, which is referred to herein as IP-D.

The internet routing system establishes default path 432 between client 406 and PNIC 430 of server 402. Application 404 binds IP-B of VNIC 424 to overlay VM 410, forming tunnel 434 (T1) and NATs IP-B to a network address of overlay VM 410. Application 404 binds IP-C of VNIC 426 to overlay VM 416, forming tunnel 436 (T2) and NATs IP-C to a network address of overlay VM 416. Application 404 binds IP-D of VNIC 428 to overlay VM 420, forming tunnel 436 (T3) and NATs IP-D to a network address of overlay VM 420.

Suppose that client 406 has four network interfaces available for MPTCP component 408 to use. Default path 432 is formed by the internet routing system using a network address of interface A at client 406 and IP-A of PNIC 430. The TCP handshake occurs over default path 432.

MPTCP component 408 forms a data communication path using interface B of client 406 and the network address of overlay VM 410. MPTCP component 408 forms a data communication path using interface C of client 406 and the network address of overlay VM 416. MPTCP component 408 forms a data communication path using interface D of client 406 and the network address of overlay VM 420.

MPTCP component 408 can utilize the four available paths in any suitable manner. For example, MPTCP component 408 can distribute the load across some or all four paths for load-balancing, achieving a total maximum throughput equal to the throughput of best performing path amongst the four paths, add the throughputs of some or all four paths to achieve cumulative throughput, and other suitable manners.

As can be seen in this figure, multiple paths are available for use with the TCP session between server 402 and client 406. The paths that include tunnels T1, T2, and T3 are individually more efficient than default path 432 in a majority of circumstances because overlay VMs 410, 416, and 420 have been selectively placed based on path performance considerations, whereas default path 432 has not been constructed with such path performance considerations.

Figure 5:
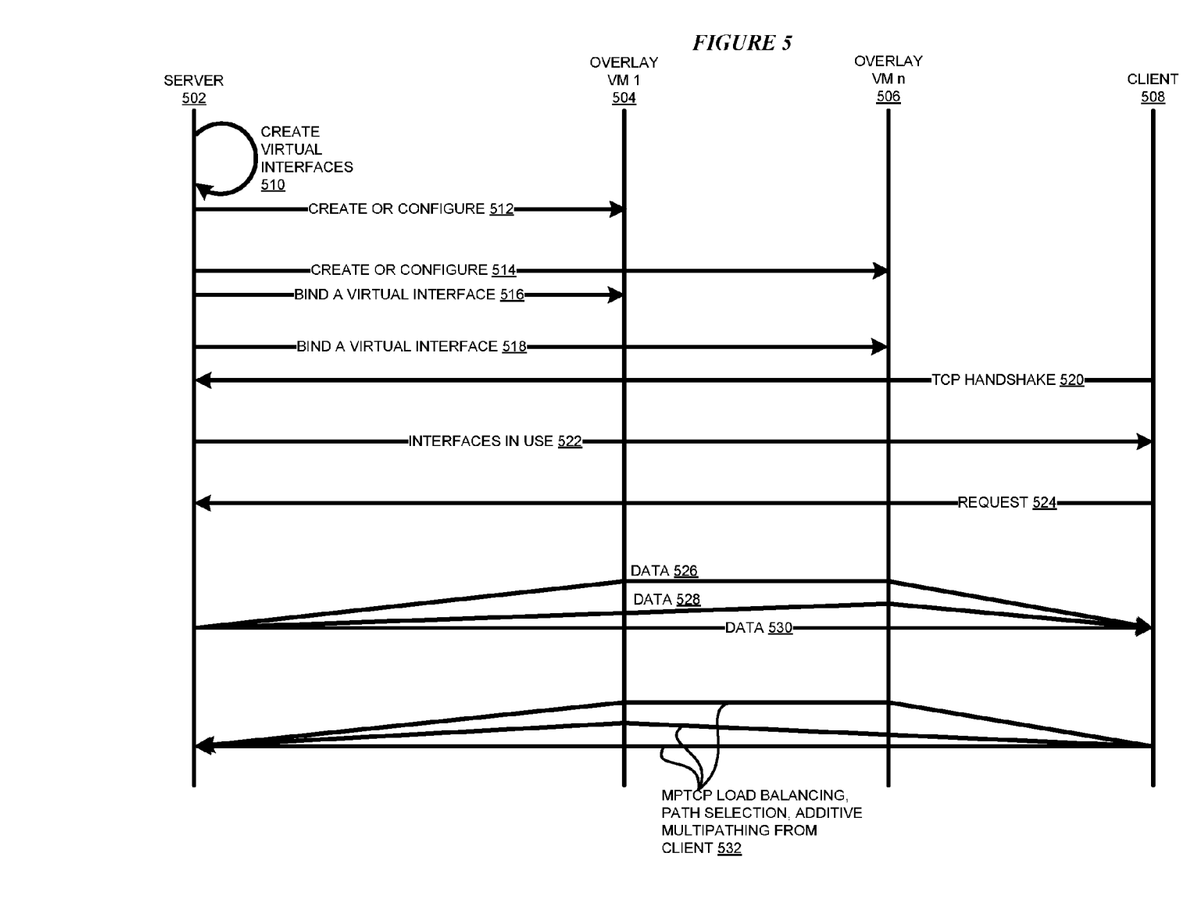
FIG. 5 depicts an example process for multipathing using a network of overlays in accordance with an illustrative embodiment.

With reference to FIG. 5, this figure depicts an example process for multipathing using a network of overlays in accordance with an illustrative embodiment. Server 502 is an example of server 402 in FIG. 4 and includes an embodiment described herein, such as in the form of application 404 in FIG. 4. Overlay VM 504 (VM 1) is an example of any overlay VM in FIG. 4, such as overlay VM 410. Any number of overlay VMs can exist in the process of FIG. 5. Overlay VM 506 (VM n) is an example of any other overlay VM in FIG. 4, such as overlay VM 416. Client 508 is an example of client 406 in FIG. 4.

An embodiment in server 502 creates a set of virtual network interfaces (510), such as VNICs 424 and 426 in FIG. 4. The embodiment creates (512) VM 1, or configures a VM already available in a selected datacenter. The embodiment creates (514) VM n, or configures a VM already available in a selected datacenter.

The embodiment binds (516) a virtual network interface with VM 1. The embodiment binds (518) another virtual network interface with VM n.

At some point in time, client 508 sends a TCP handshake message (520) to server 502. Server 502 sends, among other information in response to the handshake, information (522) about the network interfaces being used by server 502. In a suitable implementation, this information can be exchanged in an interaction other than a TCP handshake, and such other interactions are contemplated within the scope of the illustrative embodiments.

Client 508 sends request (524) for data to server 502. Request 524 can be sent via a default path to server 502, as shown, or via VM 1 or VM n (not shown). The embodiment at server 502 responds with data. The embodiment distributes the data across multiple paths, e.g., by sending portion 526 of the data via the path through VM 1, portion 528 of the data via the path through VM n, portion 530 of the data via the default path to client 508.

The MPTCP component at client 508 can use the default path to server 502, the path through VM 1, and the path through VM n in any suitable manner. For example, using these multiple paths, the MPTCP component can perform load balancing, select the best performing path, achieve the performance of the best performing path over a combination of paths, of additively use multiple paths to achieve cumulative performance, or another strategy (532).

Figure 6:
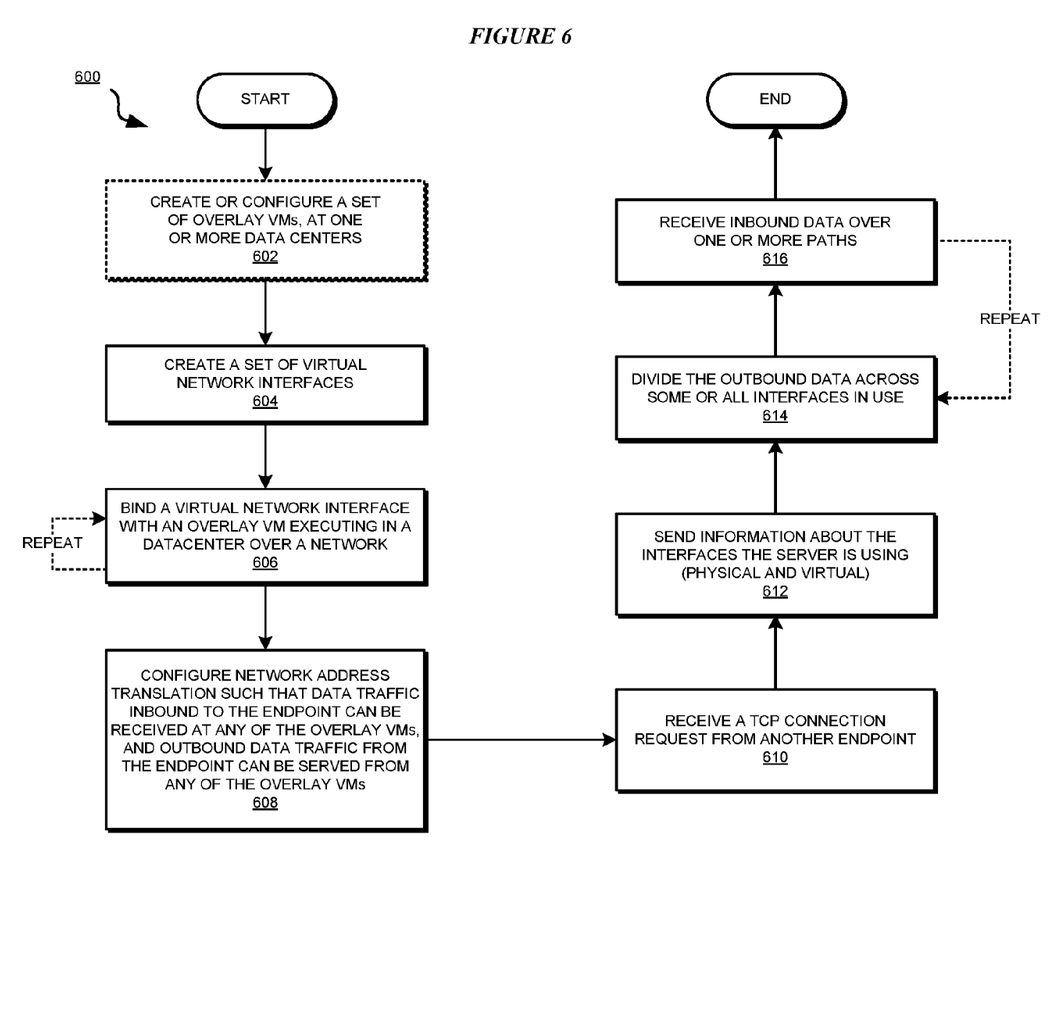
FIG. 6 depicts a flowchart of an example process for multipathing using a network of overlays in accordance with an illustrative embodiment.

With reference to FIG. 6, this figure depicts a flowchart of an example process for multipathing using a network of overlays in accordance with an illustrative embodiment. Process 600 can be implemented in application 404 in FIG. 4.

The application creates or configures a set of overlay VMs at one or more datacenters (block 602). The process of block 602 is elaborated in FIG. 7.

The application creates a set of virtual network interfaces (block 604). The application binds a virtual network interface from the set of virtual network interfaces with an overlay VM executing in a datacenter (block 606). The application may repeat block 606 to bind as many virtual network interfaces with overlay VMs as may be desired in a particular implementation.

The application configures a NAT such that data traffic inbound to the endpoint where the application is executing can be received by any of the bound overlay VMs, and the outbound data from the endpoint can be served from any of the overlay VMs (block 608).

The application receives a TCP connection request from another endpoint (block 610). The application sends to the other endpoint the information about the interfaces—virtual and physical—the server is using (block 612).

The application divides the outbound data for the other endpoint across some or all of the interfaces in use such that each path in a corresponding set of paths, which uses one of those interfaces and a bound tunnel to an overlay VM, carries a distinct portion of the data to the other endpoint (block 614). The application can receive data from the other endpoint over any of the interfaces in use (block 616). During the TCP session, block 614 and 616 may be repeated any number of times according to the data flow. When the TCP session ends, the application ends process 600 thereafter.

Figure 7:
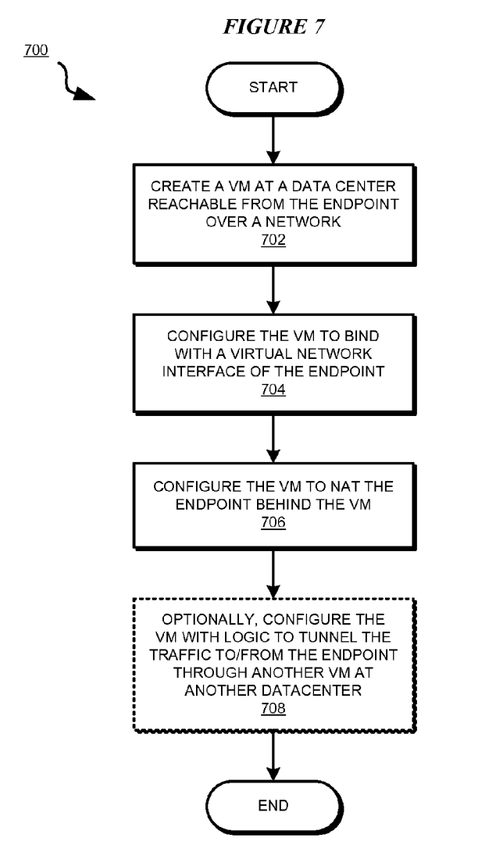
FIG. 7 depicts a flowchart of another process for multipathing using a network of overlays in accordance with an illustrative embodiment.

With reference to FIG. 7, this figure depicts a flowchart of another process for multipathing using a network of overlays in accordance with an illustrative embodiment. Process 700 can be implemented in application 404 in FIG. 4.

The application creates a VM at a datacenter that is reachable from the endpoint where the application is executing (block 702). The application configures the VM to bind with a virtual network interface at the endpoint (block 704).

The application configures the VM to NAT the bound interface of the endpoint behind the VM (block 706). Optionally, the application also configures the VM with logic to tunnel the traffic to or from the endpoint through another VM at another datacenter before reaching a destination endpoint (block 708). The application ends process 700 thereafter.

Thus, a computer implemented method, system or apparatus, and computer program product are provided in the illustrative embodiments for multipathing using a network of overlays. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for multipathing using a network of overlays, the method comprising:
    creating, by a server, using a processor and a memory, a set of virtual network interfaces (VNICs) corresponding to a physical network interface (PNIC);
    creating a first overlay virtual machine (VM) in a first datacenter in a first data processing environment;
    binding a first virtual network interface (VNIC) from the set of VNICs to the first overlay VM executing in the first datacenter in the first data processing environment across a data network from the server, the binding creating a first tunnel between the server and the first datacenter, wherein the creating the first VNIC in the set of VNICs, the creating the first overlay VM, and the binding are performed according to a demand by the server;
    binding a second virtual network interface (VNIC) from the set of VNICs to a second overlay virtual machine (VM) executing in a second datacenter in a second data processing environment across the data network from the server, the binding creating a second tunnel between the server and the second datacenter; and
    dividing, during a data communication from the server with a client system, data into a first portion, a second portion, and a third portion, the first portion using a first path from the first VNIC to the client system, the second portion using a second path from the PNIC to the client system and the third portion using a third path from the second VNIC to the client system, wherein the first path passes through the first overlay VM in the first datacenter, and the second path does not pass through the first datacenter or the second datacenter, and the third path passes through the second overlay VM in the second datacenter, wherein the first path has a higher throughput than the second path because of the first path having a better path performance metric than the second path.

2. The method of claim 1, further comprising:
    configuring a Network Address Translation (NAT) such that the client system communicates with the server by communicating with the first overlay VM at the first data processing environment.

3. The method of claim 1, further comprising:
    configuring the first overlay VM to direct the first portion of the data to the second VM in the second data processing environment; and directing, in the first path, the first portion from the first VNIC to a set of VMs in a set of data processing environments to the client system, wherein the set of VMs in a set of data processing environments includes the first VM and the second VM.

4. The method of claim 1, further comprising:
receiving, at the server from the client system, a message to initiate the data communication;
providing, from the server to the client system, responsive to the message, information of the PNIC and information of the set of VNICs.

5. The method of claim 4, further comprising:
causing, responsive to the information of the set of VNICs, a MultiPath Transmission Control Protocol (MPTCP) component of the client system to establish the first path and the second path.

6. The method of claim 5, further comprising:
receiving, responsive to the causing, a first portion of a second data from the client system on the first path, and a second portion of the second data from the client system on the second path.

7. The method of claim 1, wherein the demand comprises a request for the data communication from the client system.

8. The method of claim 1, further comprising:
terminating the data communication with the client system; and
terminating the first overlay VM in the first data processing environment responsive to terminating the data communication with the client system.

9. A non-transitory computer usable program product comprising a computer readable storage device including computer usable code for multipathing using a network of overlays, the computer usable comprising:
computer usable code for creating, by a server, using a processor and a memory, a set of virtual network interfaces (VNICs) corresponding to a physical network interface (PNIC);
computer usable code for creating a first overlay virtual machine (VM) in a first datacenter in a first data processing environment;
computer usable code for binding a first virtual network interface (VNIC) from the set of VNICs to the first overlay VM executing in the first datacenter in the first data processing environment across a data network from the server, the binding creating a first tunnel between the server and the first datacenter, wherein the creating the first VNIC in the set of VNICs, the creating the first overlay VM, and the binding are performed according to a demand by the server;
computer usable code for binding a second virtual network interface (VNIC) from the set of VNICs to a second overlay virtual machine (VM) executing in a second datacenter in a second data processing environment across the data network from the server, the binding creating a second tunnel between the server and the second datacenter; and
computer usable code for dividing, during a data communication from the server with a client system, data into a first portion, a second portion, and a third portion, the first portion using a first path from the first VNIC to the client system, the second portion using a second path from the PNIC to the client system and the third portion using a third path from the second VNIC to the client system, wherein the first path passes through the first overlay VM in the first datacenter, and the second path does not pass through the first datacenter or the second datacenter, and the third path passes through the second overlay VM in the second datacenter, wherein the first path has a higher throughput than the second path because of the first path having a better path performance metric than the second path.

10. The non-transitory computer usable program product of claim 9, further comprising:
computer usable code for configuring a Network Address Translation (NAT) such that the client system communicates with the server by communicating with the first overlay VM at the first data processing environment.

11. The non-transitory computer usable program product of claim 9, further comprising:
computer usable code for configuring the first overlay VM to direct the first portion of the data to the second overlay VM in the second data processing environment; and
computer usable code for directing, in the first path, the first portion from the first VNIC to a set of VMs in a set of data processing environments to the client system, wherein the set of VMs in a set of data processing environments includes the first overlay VM and the second overlay VM.

12. The non-transitory computer usable program product of claim 9, further comprising:
computer usable code for receiving, at the server from the client system, a message to initiate the data communication;
computer usable code for providing, from the server to the client system, responsive to the message, information of the PNIC and information of the set of VNICs.

13. The non-transitory computer usable program product of claim 12, further comprising:
computer usable code for causing, responsive to the information of the set of VNICs, a MultiPath Transmission Control Protocol (MPTCP) component of the client system to establish the first path and the second path.

14. The non-transitory computer usable program product of claim 9, wherein the computer usable code is stored in a computer readable storage device in a data processing system, and wherein the computer usable code is transferred over a network from a remote data processing system.

15. The non-transitory computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

16. A data processing system for multipathing using a network of overlays, the data processing system comprising:
a storage device, wherein the storage device stores computer usable program code; and
a processor, wherein the processor executes the computer usable program code, and wherein the computer usable program code comprises:
computer usable code for creating, by a server, using a processor and a memory, a set of virtual network interfaces (VNICs) corresponding to a physical network interface (PNIC);
computer usable code for creating a first overlay virtual machine (VM) in a first datacenter in a first data processing environment;
computer usable code for binding a first virtual network interface (VNIC) from the set of VNICs to the first overlay VM executing in the first datacenter in the first data processing environment across a data network from the server, the binding creating a first tunnel between the server and the first datacenter, wherein the creating the first VNIC in the set of VNICs, the creating the first overlay VM, and the binding are performed according to a demand by the server;

computer usable code for binding a second virtual network interface (VNIC) from the set of VNICs to a second overlay virtual machine (VM) executing in a second datacenter in a second data processing environment across the data network from the server, the binding creating a second tunnel between the server and the second datacenter; and computer usable code for dividing, during a data communication from the server with a client system, data into a first portion, a second portion, and a third portion, the first portion using a first path from the first VNIC to the client system, the second portion using a second path from the PNIC to the client system and the third portion using a third path from the second VNIC to the client system, wherein the first path passes through the first overlay VM in the first datacenter, and the second path does not pass through the first datacenter or the second datacenter, and the third path passes through the second overlay VM in the second datacenter, wherein the first path has a higher throughput than the second path because of the first path having a better path performance metric than the second path.

* * * * *